(12) United States Patent
Mossoba et al.

(10) Patent No.: US 11,151,546 B2
(45) Date of Patent: *Oct. 19, 2021

(54) TRIGGER PEER TO PEER PAYMENT WITH FINANCIAL CARDS AND PHONE CAMERA

(71) Applicant: Capital One Services, LLC, McLean, VA (US)

(72) Inventors: Michael Mossoba, Arlington, VA (US); Joshua Edwards, Philadelphia, PA (US); Abdelkader M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/740,727

(22) Filed: Jan. 13, 2020

(65) Prior Publication Data

US 2020/0151706 A1 May 14, 2020

Related U.S. Application Data

(63) Continuation of application No. 16/208,908, filed on Dec. 4, 2018, now Pat. No. 10,552,825, which is a
(Continued)

(51) Int. Cl.
*G06Q 40/00* (2012.01)
*G06Q 20/34* (2012.01)
(Continued)

(52) U.S. Cl.
CPC ......... *G06Q 20/346* (2013.01); *G06Q 20/223* (2013.01); *G06Q 20/40* (2013.01); *G06Q 20/40145* (2013.01)

(58) Field of Classification Search
CPC ..... G06Q 40/00; G06Q 20/223; G06Q 20/346
See application file for complete search history.

(56) References Cited

U.S. PATENT DOCUMENTS 8,868,902 B1  2/2014  Brown et al.
9,864,982 B2  1/2018  Bristow et al.
(Continued)

OTHER PUBLICATIONS

Will That Be Cash, Card Or Finger? Davis, Donald. Card Technology; New York vol. 11, Iss. 5, (May 2006): 28-33. (Year: 2006).*
(Continued)

*Primary Examiner* — Lalita M Hamilton
(74) *Attorney, Agent, or Firm* — DLA Piper LLP US

(57) ABSTRACT

The disclosure relates to initiating and completing peer to peer payments or peer to merchant payments initiated by financial cards and cameras of mobile devices. In some embodiments, the disclosed systems and methods may provide an accurate determination of parties involved in a peer to peer transaction, be useable with hardware and software that users are already in possession of, and securely initiate a peer to peer transaction. The disclosed systems may include a server communicatively coupled to a mobile device by a network. The server may receive an image of one or more financial cards, retrieve account information for each financial card in the received image, generate a proposed transaction based on the retrieved account information, transmit the proposed transaction to the mobile device, receive approval for the proposed transaction and initiate a payment or a transfer to an account based on the retrieved account information.

20 Claims, 4 Drawing Sheets

Related U.S. Application Data continuation of application No. 15/910,320, filed on Mar. 2, 2018, now Pat. No. 10,192,215.

(51) Int. Cl.
*G06Q 20/22* (2012.01)
*G06Q 20/40* (2012.01)

(56) References Cited

U.S. PATENT DOCUMENTS

| | | |
|---|---|---|
| 9,864,986 B1 | 1/2018 | White et al. |
| 2007/0255653 A1 | 11/2007 | Tumminaro et al. |
| 2010/0121745 A1 | 5/2010 | Teckchandani et al. |
| 2011/0137789 A1 | 6/2011 | Kortina et al. |
| 2013/0048714 A1 | 2/2013 | Sharma et al. |
| 2013/0262294 A1 | 10/2013 | Green et al. |
| 2014/0089195 A1 | 3/2014 | Ward et al. |
| 2015/0348019 A1 | 12/2015 | Faith et al. |
| 2016/0125383 A1 | 5/2016 | Chan et al. |
| 2017/0046668 A1 | 2/2017 | Rowley et al. |
| 2018/0082278 A1 | 3/2018 | Bristow et al. |
| 2018/0096351 A1 | 4/2018 | Dahn |

OTHER PUBLICATIONS

"Mobile Payments Services | Compare Market Leaders", Credio, http://peer-to-peer-payments.credio.com, 2018.
"Bankers Talk Innovation", San Diego Business Journal 32,46: 12(3). CBJ, L.P., Nov. 14, 2011.

\* cited by examiner

TRIGGER PEER TO PEER PAYMENT WITH FINANCIAL CARDS AND PHONE CAMERA

CROSS-REFERENCE

This is a continuation application of U.S. application Ser. No. 16/208,908, filed Dec. 4, 2018, which is a continuation of U.S. application Ser. No. 15/910,320, filed Mar. 2, 2018, the content of which are hereby incorporated by reference in its entirety herewith.

TECHNICAL FIELD

The present disclosure generally relates to the field of electronic transactions, and more particularly, to peer-to-peer transactions.

BACKGROUND

Peer to peer transactions (also referred to as person-to-person transactions, P2P transactions or P2P payments) involve electronic money transfers from one person to another through an intermediary, such as a P2P payment application. Example P2P payment applications include Venmo®, PayPal®, and the like.

However, conventional peer to peer transaction methods require users to enter in specific information about other users and participants to the transaction manually such as an email address or phone number. Requiring users to enter information about other users and participants may be prone to typographical errors or mistakes that may cause transaction delays, or erroneous transactions (where transactions are lost or delivered to the wrong individual). Accordingly, there remains a need for the more accurate determination of parties involved in a peer to peer transaction.

Additionally, in conventional peer to peer systems, submitting a peer to peer payment to someone (e.g. peer or merchant/entity) that you have not previously conducted a transaction with is a slow process that requires the input of multiple levels of information and may require the downloading of a specific application or software, or the purchase of specialized hardware. Accordingly, there remains a need for a faster process for initiating transactions between parties who have not previously conducted transactions. Moreover, there is a need for this process to be useable with hardware and software that users are already in possession of.

Additionally, conventional peer to peer systems may be prone to security risks. For example, because conventional peer to peer transactions may be initiated solely using an application on a mobile phone, peer to peer transactions may be fraudulently initiated by someone who has gained access to the phone using a security code, fingerprint, or facial scan, or by someone who has gained access to the peer to peer account through an online portal. Accordingly, there remains a need to be able to securely initiate a peer to peer transaction.

SUMMARY

The present disclosure is directed towards systems and methods for initiating and completing peer to peer payments or peer to merchant payments that is initiated by financial cards and cameras. In some embodiments, the disclosed systems and methods may provide an accurate determination of parties involved in a peer to peer transaction, be useable with hardware and software that users are already in possession of, and securely initiate a peer to peer transaction.

In some embodiments, a method may include the steps of receiving an image of one or more financial cards, retrieving account information for each financial card in the received image, generating a proposed transaction based on the retrieved account information, transmitting the proposed transaction to the mobile device, receiving an approval for the proposed transaction, and initiating a payment or transfer to an account based on the retrieved account information responsive to receiving approval for the proposed transaction. In some embodiments, a proposed transaction includes at least one payer, and at least one recipient, that are determined by the relative positioning of the one or more financial cards within the image.

In another embodiment, a method may include the steps of providing a user interface for peer to peer transactions, displaying by the user interface at least one template for financial card placement, obtaining by the user interface an image of one or more financial cards placed in accordance with the displayed at least one template, transmitting the obtained image by the user interface to the remote server, receiving by the user interface from the remote server at least one proposed transaction, displaying by the user interface the at least one proposed transaction, receiving by the user interface approval of the displayed at least one proposed transaction from one or more users of the mobile device, and transmitting by the user interface approval of the displayed at least one proposed transaction to the remote server. In some embodiments, the proposed transaction may include at least one payer, and at least one recipient, that are determined by the relative positioning of the one or more financial cards within the obtained image.

In yet another embodiment, an improved peer to peer transaction system may include at least one server communicatively coupled to a mobile device by a network and include a non-transitory memory storing computer-readable instructions and at least one processor. The at least one server may be instructed to receive an image of one or more financial cards from the mobile device, retrieve account information for each financial card in the received image, generate at least one proposed transaction based on the retrieved account information, transmit the proposed transaction to the mobile device, receive an approval for the proposed transaction, and initiate a payment or a transfer to an account based on the retrieved account information responsive to receiving approval for the proposed transaction. In some embodiments, the proposed transaction includes at least one payer and at least one recipient and may be determined by the relative positioning of the one or more financial cards within the image.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
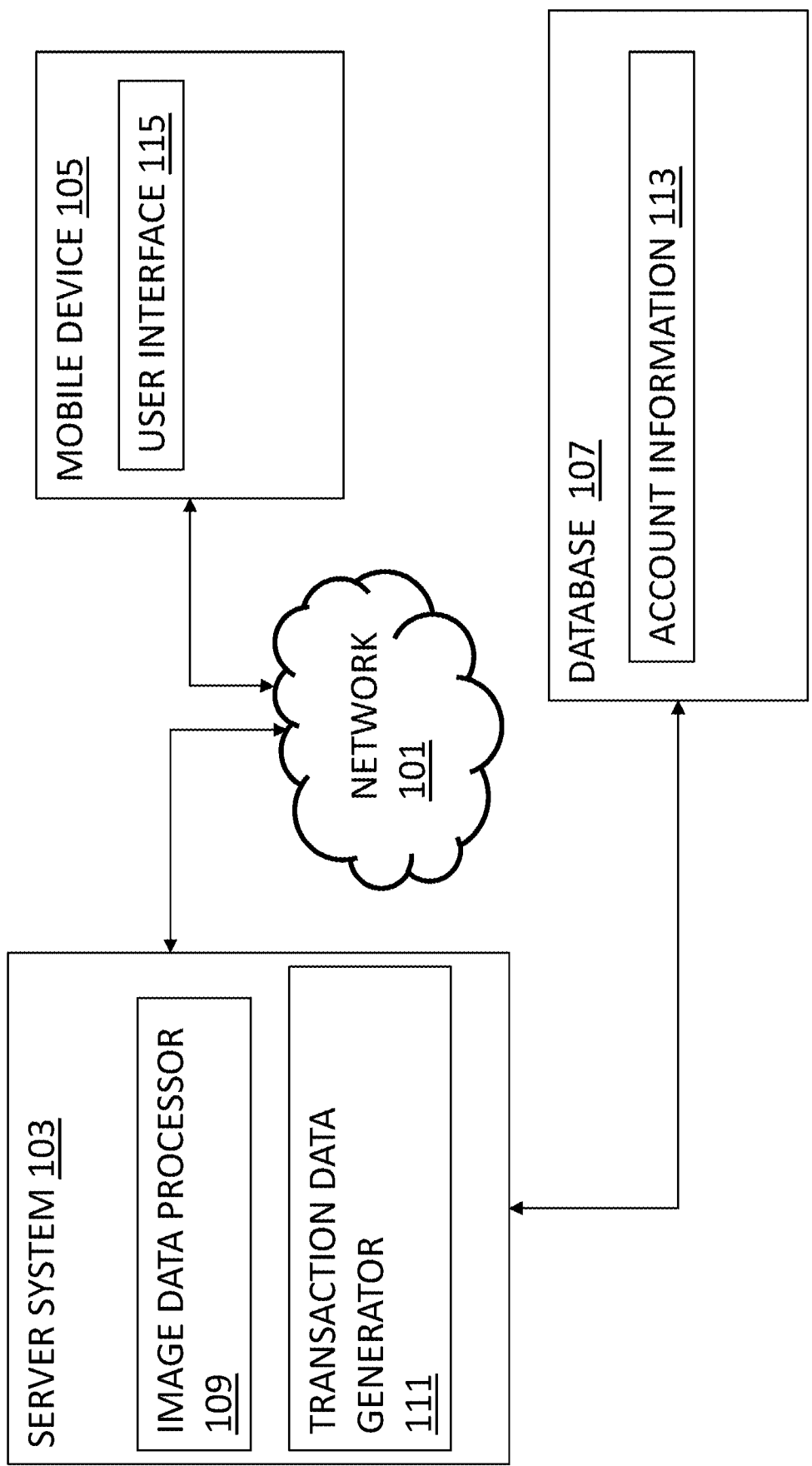
FIG. 1 is a system diagram for an improved peer to peer transaction system in accordance with an aspect of the present disclosure.

The present disclosure is directed towards a system for initiating peer to peer payments or peer to merchant payments using financial cards (e.g., credit cards, debit cards, gift cards, store cards) and a camera. In some embodiments, peer to peer payments or merchant payments may be initiated using other types of cards (e.g. an identity card, membership card), a token or other identifying object or indicia that is recognizable in an image and may be uniquely linked or associated with a user or a financial card or account that may be used to conduct payment. As will be discussed, the camera may be present on a mobile device of a user.

In some embodiments, the disclosed systems may provide a more accurate determination of parties involved in a peer to peer transaction. In some embodiments, the disclosed systems may provide a faster process for initiating transactions between peers who have not previously conducted transactions. In some embodiments, the disclosed systems may be useable with hardware and software that users are already in possession of (e.g., financial cards, mobile phones). In some embodiments, the disclosed system may be able to securely initiate a peer to peer transaction.

In some embodiments, a software application may be installed on a user's mobile device (e.g., cell phone, tablet). The software application may be configured to facilitate peer to peer transactions. The software application may be configured to utilize the mobile device's camera to take an image of one or more objects, which may include financial cards or other card, token, object, indicia, etc. Using the images, the software application and server system coupled to the software application may be able to lookup account information related to the accounts associated with the objects and/or mobile device. The software application and server system may determine a type of transaction (e.g. peer to peer or merchant) and/or each account's role in the transaction (i.e., payer, recipient) based on the positioning (and/or relative positioning) of the objects within the obtained image. For example, a financial card located at the top in the image may be designated as a recipient, while a financial card(s) located at the bottom of the image may be designated as a payer(s). In another example, the software application and server system may also determine a proposed value for the financial transaction based on the positioning of the objects or financial cards. For example, if two cards are placed side by side in the bottom of the image, they may each pay the recipient an equal portion of a total transaction amount. In some embodiments, the total transaction amount may be entered by the user of the mobile device or captured in the image. The user of the mobile device may also verify the transaction. Once the transaction is verified, in some embodiments the server system may initiate an electronic monetary transfer between the payers and recipients.

While in some embodiments, the positioning (and/or relative positioning) of objects within the obtained image may be a mechanism to communicate details of one or more transactions, in some embodiments details of one or more transactions may be communicated via the positioning or movement of objects within a short video, an audio clip (e.g., "split the transaction into these two cards") and the like.

In some embodiments, the disclosed systems and methods for improved peer to peer transactions may provide additional security when compared to conventional systems. In particular, by initiating a peer to peer transaction based on a captured image of a financial card or other uniquely associated personal object in addition to a login to a software application, the systems and methods disclosed herein provide an extra layer of security, as users demonstrate possession of both the financial card (or personal object) and the software application (e.g., mobile application on a cell phone).

We turn now to FIGS. 1-4, which illustrate systems and methods for improved peer to peer transactions. While the embodiments detailed below refer to image capture of financial cards, the disclosed embodiments also encompass image capture of other objects uniquely associated with or uniquely identifying a user or merchant. FIG. 1 illustrates a system having a server system 103 communicatively coupled to a mobile device 105 via network 101. The server system 103 may also be communicatively coupled to a database 107.

In some embodiments, the server system 103 may include an image data processor 109 and a transaction data generator 111. The image data processor 109 may be configured to retrieve account information for each financial card in the received image.

The transaction data generator 111 may be configured to generate one or more proposed transactions based on the retrieved account information. In some embodiments, the proposed transaction may include at least one payer, and at least one recipient. In some embodiments, the payer and recipients may be determined by the relative positioning of financial cards etc. within the received image. In some embodiments, the payer and recipients may also be designated via a user input, which may be made via a selection or designation on an interface.

The mobile device 105 may include a user interface 115 such as a software application. The software application may be configured to interface with a camera of the mobile device 105 to take an image of the financial cards. In some embodiments, the software application may be configured to display a proposed transaction on the mobile device, receive approval for the proposed transaction and/or initiate a payment or transfer to an account based on receiving approval for the proposed transaction. In some embodiments, a payment or transfer to an account may be initiated without receiving approval for a proposed transaction. The mobile device 105 may communicate over the network 101 using programs or applications. In one example embodiment, methods of the present disclosure may be carried out by an application running on one or more mobile devices and/or a web browser running on a stationary computing device. In some embodiments, the user interface 115 may include a graphical user interface. In some embodiments, the user may have to provide login credentials to access the user interface 115.

The database 107 may include one or more data tables, data storage structures and the like. For example, the database 107 may store account information 113.

The network 103 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks.

Although one computing device (i.e., server system 103, and mobile device 105) may be shown and/or described, multiple computing devices may be used. Conversely, where multiple computing devices are shown and/or described, a single computing device may be used.

Figure 2:
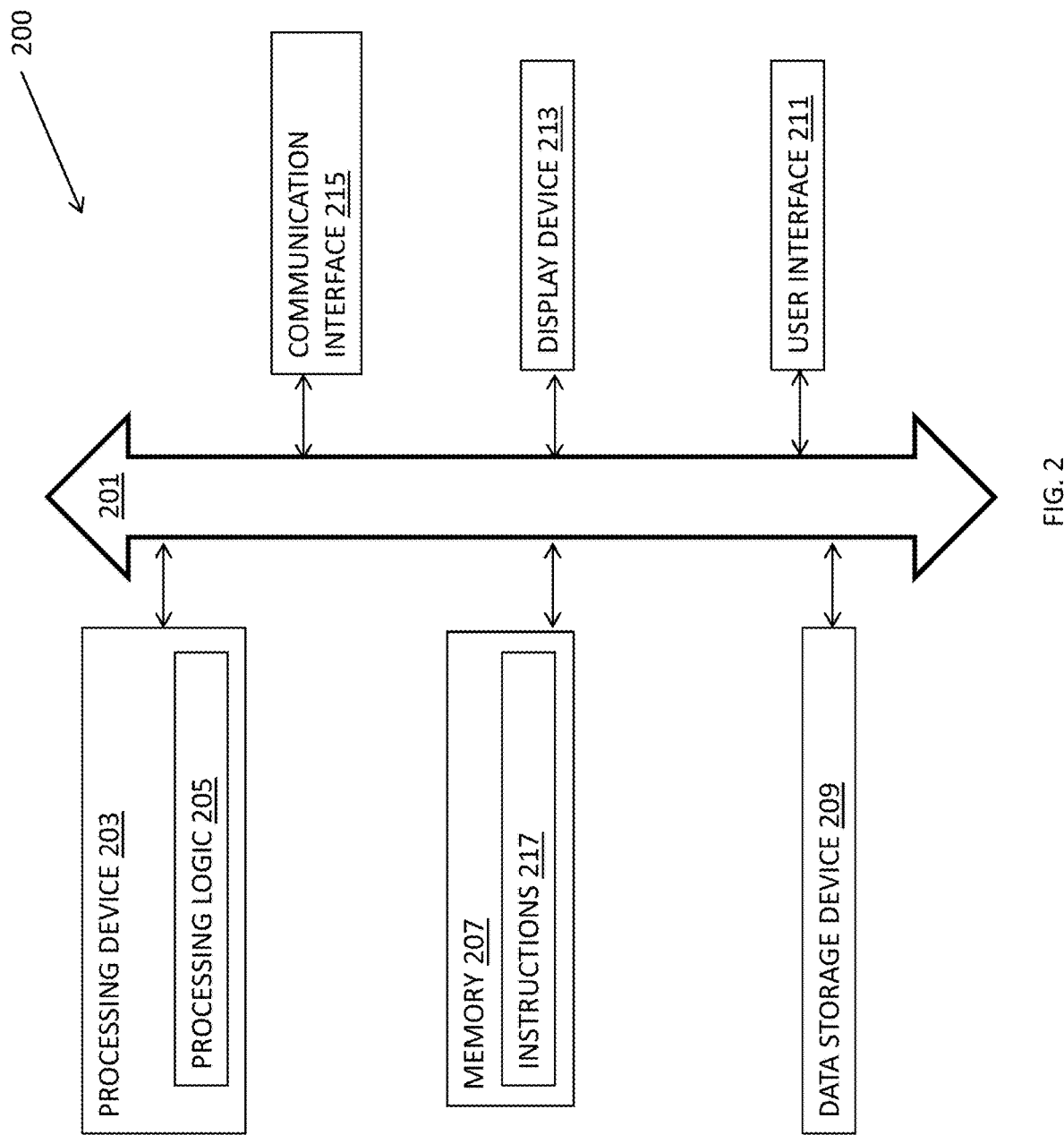
FIG. 2 is a system diagram for an improved peer to peer transaction system in accordance with an aspect of the present disclosure.

FIG. 2 illustrates a functional block diagram of a machine in the example form of computer system 200, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of the mobile device 105 and the server system 103 may be implemented by the example machine shown in FIG. 2 (or a combination of two or more of such machines).

Example computer system 200 may include processing device 203, memory 207, data storage device 209 and communication interface 215, which may communicate with each other via data and control bus 201. In some examples, computer system 200 may also include display device 213 and/or user interface 211.

Processing device 203 may include, without being limited to, a microprocessor, a central processing unit, an application specific integrated circuit (ASIC), a field programmable gate array (FPGA), a digital signal processor (DSP) and/or a network processor. Processing device 203 may be configured to execute processing logic 205 for performing the operations described herein. In general, processing device 203 may include any suitable special-purpose processing device specially programmed with processing logic 205 to perform the operations described herein.

Memory 207 may include, for example, without being limited to, at least one of a read-only memory (ROM), a random access memory (RAM), a flash memory, a dynamic RAM (DRAM) and a static RAM (SRAM), storing computer-readable instructions 217 executable by processing device 203. In general, memory 207 may include any suitable non-transitory computer readable storage medium storing computer-readable instructions 217 executable by processing device 203 for performing the operations described herein. Although one memory device 207 is illustrated in FIG. 2, in some examples, computer system 200 may include two or more memory devices (e.g., dynamic memory and static memory).

Computer system 200 may include communication interface device 215, for direct communication with other computers (including wired and/or wireless communication), and/or for communication with network 101 (see FIG. 1). In some examples, computer system 200 may include display device 213 (e.g., a liquid crystal display (LCD), a touch sensitive display, etc.). In some examples, computer system 200 may include user interface 211 (e.g., an alphanumeric input device, a cursor control device, etc.).

In some examples, computer system 200 may include data storage device 209 storing instructions (e.g., software) for performing any one or more of the functions described herein. Data storage device 209 may include any suitable non-transitory computer-readable storage medium, including, without being limited to, solid-state memories, optical media and magnetic media.

Figure 3:
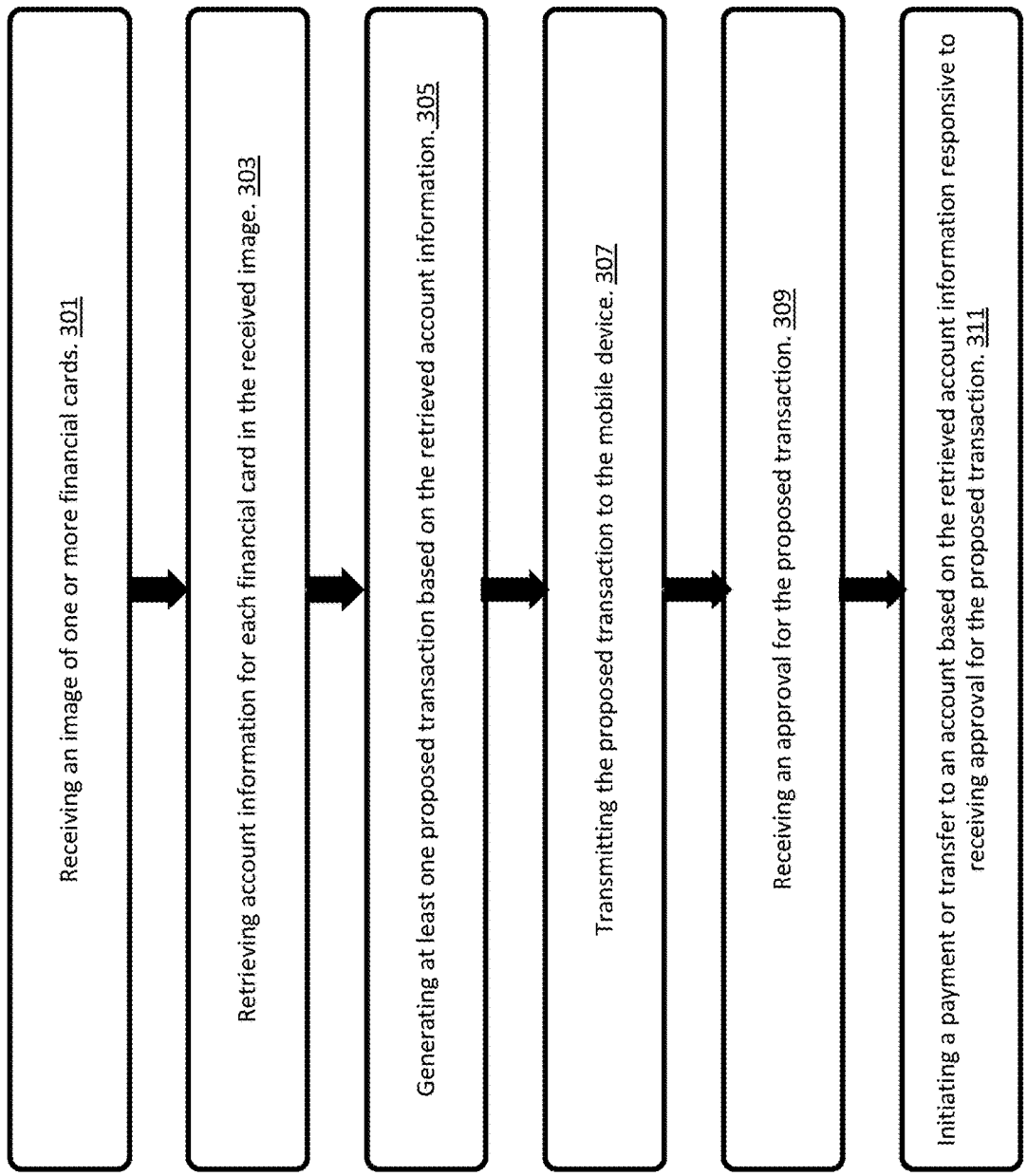
FIG. 3 is a flowchart diagram for a process in an improved peer to peer transaction system in accordance with an aspect of the present disclosure.

FIG. 3 is a flowchart diagram for a process for initiating and completing peer to peer payments or peer to merchant payments that is initiated by financial cards and cameras in accordance with an aspect of the present disclosure. As illustrated in the flowchart, at step 301 a server system such as server system 103 of FIG. 1, may receive an image of one or more financial cards. The image may be received via an application executing on a mobile device or other session of a desktop computer, for example. The application or session may include aspects for first authenticating a user of the application or session. In some embodiments, the image may also include one or more metadata indicative of a timestamp of the captured image or indicia associated with the capturing device, for example. Such metadata may be used for further authentication or validation techniques of the received image. In some embodiments, the remaining steps of the example process may not be performed if the image cannot be validated or authenticated. Such as if the received image is not associated with a timestamp within a threshold window of the image being received at the server. At step 303, the server system may retrieve account information for each financial card that is depicted in the received image. In some embodiments, this may involve utilizing an image data processor, such as image data processor 109 of FIG. 1, that is configured to apply optical character recognition or other image processing techniques to identify one or more information fields from the financial card. Example information fields may include a name, a financial card account number, a financial card expiration data, a security code and/or a signature. In some embodiments, the server system may perform additional image processing to verify authenticity or validity of one or more of the financial cards depicted in the received image. The server system may also perform operations for verifying at least one of the cards in the image is associated with an authenticated user of the application or session.

Retrieving account information may also involve the sub-step of querying a database, such as database 107 of FIG. 1, that is communicatively coupled to the server system. In this manner the server system may determine if the financial card is associated with an account by determining whether there is an entry in the database that corresponds to one of the identified information fields. In some embodiments, this may involve looking up data in a data structure such as the account information data structure 113 of FIG. 1. The database entries may provide the server system with account information including, for example, an account holder name, account type, account holder address, account holder income, account holder balance, account holder credit, account holder preferred transaction medium, and account holder contact information, which may include an identifier or phone number associated with the mobile device of the account holder. Account type may indicate a credit card account, a debit card account, a checking account, a mortgage account, a savings account, an investment account, a loan account, and the like. Account holder balance may indicate a balance for an account. Account holder credit may indicate a credit line amount available to the account holder. Account holder preferred medium may indicate the medium by which the account holder may prefer to initiate a payment or transfer to an account, such as, for example, a credit card or a checking account. Account holder contact information may include an email address, a mailing address, a telephone number, a mobile telephone number, and the like.

At step 305, the server system may generate at least one proposed transaction based on the retrieved account information. The proposed transaction may include one or more payers, one or more recipients and optionally, an amount. In some embodiments, the proposed transaction may be composed of one or more sub-transactions. In some embodiments, the payers, recipients, and/or amounts may be determined based on the relative positioning of the one or more financial cards within the image in addition to the number of financial cards that are present within the image. For example, if two financial cards are placed in a top-down or left-right configuration, the account corresponding the top or left position may be designated as a recipient and an account corresponding to the down or right position may be designated as a payer. Alternatively, if two financial cards are placed in a top-down or left-right configuration, the account corresponding to the down or right position may be designated as a recipient and an account corresponding to the top or left position may be designated as a payer. In an additional example, if two financial cards are placed side by side in a first row that is above or below a top card in a second row, the financial cards in the first row may be designated as payers and the financial card in the second row may be designated as a recipient. As the financial cards are placed side by side, the proposed transaction may indicate an even split of the transaction amount. In such an example, the sub-transactions may include a transaction from each account affiliated with one of the side by side financial cards to the recipient account indicated by the single financial card. In some embodiments, the proposed transaction may not designate an amount and instead designate a recipient percentage and a payer percentage, each indicating the percentage of the total transaction amount the recipient or payer may receive or pay, respectively. As will be discussed further below, in some embodiments, the positioning and relationship between the financial cards may be designated in a template that is displayed to a user of the mobile device.

At step 307, the proposed transaction may be transmitted from the server system to the mobile device, where it is displayed to a user. In some embodiments, a proposed transaction (or at least aspects or details of a proposed transaction) may be generated by an application executing on a mobile device and displayed and confirmed by a user in association with the image capture. Such proposed transaction details and user confirmation may be provided as part of step 301. In such cases, operations 307 and 309 may not be performed. Alternatively, operations 307 and 309 may be performed to re-confirm the details of the proposed transaction or confirm additional details of the transaction that may not have been previously confirmed. Optionally, the user may provide approval/disapproval or edits to the proposed transaction. In some embodiments, for example, the user of the mobile device may adjust or enter the transaction amount, the recipient percentage and/or the payer percentage.

At step 309, the server system may receive approval for the proposed transaction. In some embodiments, this may include an adjusted proposed transaction including a modified or entered transaction amount, recipient percentage and/or payer percentage. In some embodiments, as part of step 309, the server system may require approval for the proposed transaction from each of the parties to the transaction, or the parties designated as payers based on the above operations. This aspect may not be applicable if the only payer is an authenticated user of the application or session. But if one or more designated payers have not yet been authenticated, server system 309 may provide a notification to a mobile device associated with each of the designated payers to confirm authorization for the transaction.

In response to receiving approval for the proposed transaction, in some embodiments, at step 311 the server system may initiate a payment or transfer to an account based on the retrieved account information. Payments or transfers to an account may be mediated by a third party application such as Paypal®, Venmo®, and Zelle®. The server system may provide the adjusted proposed transaction, the proposed transaction and/or account information for the recipients and/or payers to the third party application such that the payments or transfers to an account may be completed. Payment or transfers to an account may also be mediated by automated clearing houses (ACH), intrabank transfer or any other of a number of methods based on the nature of the accounts that are part of the transaction or other preconfigured or designated methods.

Figure 4:
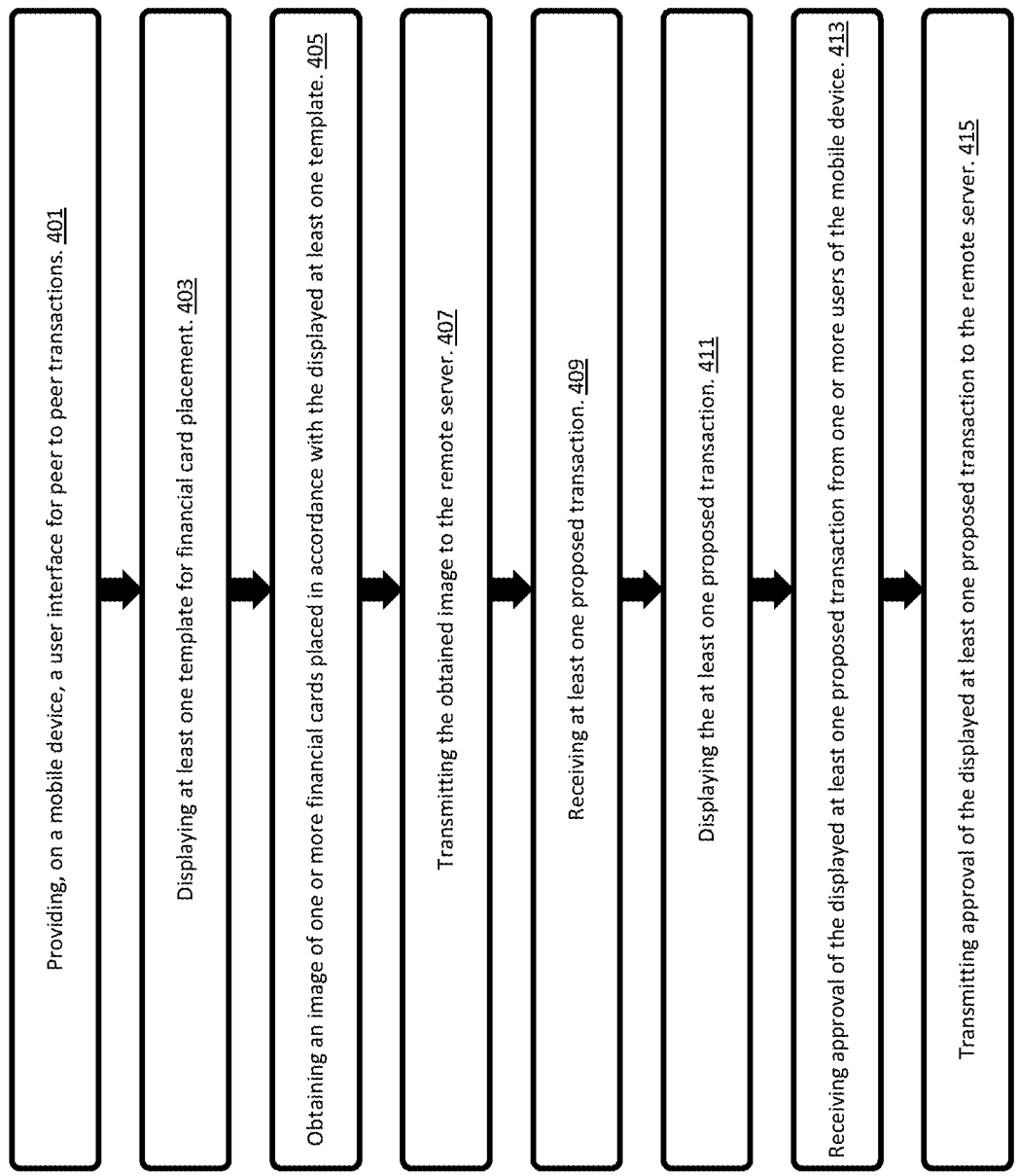
FIG. 4 is a flowchart diagram for a process in an improved peer to peer transaction system in accordance with an aspect of the present disclosure.

FIG. 4 is a flowchart diagram for a process for initiating and completing peer to peer payments or peer to merchant payments that is initiated by financial cards and cameras in accordance with an aspect of the present disclosure. As illustrated in the flowchart, at step 401 a mobile device such as mobile device 105 of FIG. 1, may provide a user interface such as user interface 115 for peer to peer transactions. At step 403, the user interface may display at least one template for financial card placement. In some embodiments, the template may indicate where the financial cards may be placed such that the account associated with the financial card is designated a payer or a recipient. In some embodiments, the template may indicate where the financial cards may be placed such that the transaction amount is split appropriately between the financial cards in the image. In some embodiments, the template may be displayed on the user interface on a screen of a mobile device within a software application such as a mobile application. In some embodiments, the template may be displayed over an image of the camera capture.

At step 405, the mobile device may obtain an image of one or more financial cards that are placed in accordance with the displayed template. The image may be obtained as a still image, a series of images, or a moving image. In some embodiments, the template and mobile application may be configured such that when a card is placed in the location indicated by a template, the card is automatically imaged using a camera of the mobile device. In some embodiments, the user of the mobile device 105 may take an image or images of the financial card(s). In some embodiments an application executing on mobile device 105 may be configured to recognize the financial cards in the captured image(s) and their relative placement and extract or crop images of the financial cards from the captured images as a whole for subsequent display in the interface. This may be beneficial for example, when a plurality of financial cards may be captured in a moving image, because a still image may not be satisfactory for sufficiently capturing the details of a plurality of cards (e.g. the number of cards require an image captured from a greater distance at which the details of the cards may not be satisfactorily determined). In some embodiments, an interface 115 may include capabilities that enable a user to designate one or more of the financial cards as a payer or recipient in association with a captured image (e.g. based on the captured image, a crop of the card, or information identifying the card). For example, interface 115 may enable a user to place a payer tag over or in association with an image of the financial card associated with the payer, and/or a recipient tag over or in association with an image of the financial card associated with the recipient. In some embodiments, interface 115 may enable a user to enter contact information such as a name or phone number or email address associated with a designated payer or recipient. Interface 115 may also enable a user to input, designate, or confirm one or more details of the proposed transaction, such as a payment amount, allocation amount, etc.

At step 407, the mobile device may transmit the obtained image to the remote server. In some embodiments, the mobile application may screen an obtained image to determine if the image quality is sufficient (i.e., the financial card information is visible) prior to transmitting the obtained image to the server system. In some embodiments, as part of step 407, the mobile device may transmit metadata associated with the captured image(s) and/or other details of the transaction including a user confirmation or other contact information, etc.

At step 409, the mobile device may receive a proposed transaction (and/or additional details etc. of the proposed transaction) from the remote server. The proposed transaction may include at least one payer and at least one recipient. In some embodiments, the proposed transaction may include a recipient and/or payer percentage, a transaction amount, or one or more sub-transaction accounts.

At step 411, the mobile device may display the proposed transaction. In some embodiments, the proposed transaction may be displayed on a plurality of mobile devices, each corresponding to an account indicated by the financial cards. For example, if Persons A and B are designated as payers and Person C as a recipient after financial cards belonging to Persons A, B, and C are imaged, the proposed transaction may be displayed on user interfaces, and more particularly, mobile applications, displayed in their respective mobile device.

At step 413, the one or more users of the mobile devices may provide approval of the displayed proposed transaction. In some embodiments, the users of the mobile devices may adjust the proposed transaction prior to approval. In some embodiments, the users may adjust or enter the transaction amount, sub-transaction accounts, the recipient percentage and/or the payer percentage. In some embodiments, approval of the proposed transaction may be an iterative process, where the adjusted proposed transaction is transmitted to the mobile devices of all parties to the transaction and only when approval is received from all parties to the transactions, is the approval of the displayed proposed transaction transmitted to the remote server.

For example, if Persons A, B, C and D go out to dinner and Persons A and B wish to pay using a single financial card, and Person D wishes to put the entire amount of the transaction to the restaurant on their card the disclosed systems and methods may be used as follows. Consider that Financial Card X corresponds to Persons A and B, Financial Card Y corresponds to Person C, and Financial Card Z corresponds to Person D. Person D may complete a transaction with the restaurant placing the entirety of the dinner bill on their card. Persons A, B, C, and D may utilize the disclosed systems and methods as follows. They may place two financial cards side by side (e.g., Card X for Persons A and B, and Card Y for Person C) in a location designated for the payers by the template. The third financial card (e.g., Card Z for person D) may be placed in a location designated for the recipient by the template. The cards may then be imaged and a proposed transaction may be generated. As the server system may not be aware that card X corresponds to two individuals, the initial proposed transaction may designate an equal split (50% payer percentage for Card X, 50% payer percentage for Card Y and 100% payer recipient for Card Z) between Card X and Card Y for a transaction amount. Once the initial proposed transaction is transmitted to the mobile devices of Persons A, B, C, and/or D, the users may adjust the proposed transaction such that Card X has a 67% payer percentage and Card Y has a 33% payer percentage. The users may also adjust the proposed transaction by entering the transaction amount, for example, the total amount of the restaurant bill less Person D's contribution to the bill. The proposed transaction may include one or more sub-transactions, such as a payment of $67 from the account corresponding to Card X to the account corresponding to Card Z and a payment of $33 from the account corresponding to Card Y to the account corresponding to Card Z (when the transaction amount is $100).

At step 415, approval of the displayed proposed transaction may be transmitted to the remote server. In some embodiments, approval of the proposed transaction may be an iterative process, where the adjusted proposed transaction is transmitted to the mobile devices of all parties (or in some embodiments just the designated payers) to the transaction and only when approval is received from all parties to the transactions, is the approval of the displayed proposed transaction acted on by the remote server. In some embodiments, the adjusted proposed transaction is transmitted to the remote server. In other embodiments, approval of the displayed proposed transaction may be an optional step.

In some embodiments, the mobile device may be further configured to obtain an image of a transaction document, transmitting the obtained image to a remote server, and determine a transaction amount for the proposed at least one transaction based on the obtained image. In some embodiments, the transaction document may include at least one of a receipt, a statement, a bill of sale, a menu, an itemized list, and the like. In some embodiments, the user interface may include an optical character recognition program that is configured to identify a transaction amount from an image of a receipt, statement, bill of sale, menu, and/or itemized list.

In some embodiments, if the peer to peer transaction is initiated from a payer's mobile device, the disclosed systems and methods may look up account information for the recipient and utilize data stored on the payer's mobile device, or account information associated with the payer's profile in the mobile application. In some embodiments, if the peer to peer transaction is initiated from a recipient's mobile device, the disclosed systems and methods may look up account information for the payer and utilize data stored on the recipient's mobile device, or account information associated with the recipient's profile in the mobile application.

In some embodiments details of one or more transactions may be communicated via the positioning or movement of objects within a short video, an audio clip (e.g., "split the transaction into these two cards") and the like, in addition to or in place of the template described with respect to the examples illustrated in FIGS. 1-4 above.

In some examples, some or all of the logic for the above-described techniques may be implemented as a computer program or application or as a plug in module or sub component of another application. The described techniques may be varied and are not limited to the examples or descriptions provided. In some examples, applications may be developed for download to mobile communications and computing devices, e.g., laptops, mobile computers, tablet computers, smart phones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. An improved method for facilitating a multi-party transaction comprising:
receiving, by a server communicatively coupled to a mobile device by a network, an image including one or more financial cards and a transaction document, wherein each financial card is associated with a party to the multi-party transaction, wherein the server further comprises a non-transitory memory storing computer-readable instructions and at least one processor;
determining, by the server, account information for each party to the multi-party transaction based on the received image;
generating, by the server, parameters for the multi-party transaction based on the retrieved account information, the relative positioning of the one or more financial cards within the received image, and the transaction document;
transmitting, by the server, the generated parameters to the mobile device;
receiving, by the server, an approval for the generated parameters; and
initiating, by the server, the multi-party transaction based on the generated parameters, by at least one of crediting or debiting accounts associated with the parties to the multi-party transaction based on the determined account information, responsive to receiving approval for the generated parameters.

2. The method of claim 1, wherein the parameters comprise at least one of a payer, a recipient, and a transaction value, wherein the at least one payer, recipient, and transaction value are determined by relative positioning of the one or more financial cards within the received image.

3. The method of claim 1, wherein determining account information for each party to the multi-party transaction comprises:
identifying at least one information field for each financial card in the image; and
querying a database communicatively coupled to the server to determine if the financial card is associated with an account.

4. The method of claim 3, wherein the at least one information field comprises at least one of a name, financial card account number, financial card expiration date, security code and signature.

5. The method of claim 1, wherein account information further comprises at least one of account holder name, account type, account holder address, account holder income, account holder balance, account holder credit, account holder preferred transaction medium, and account holder contact information.

6. The method of claim 1, wherein the multi-party transaction comprises one or more sub-transaction amounts based on the relative positioning of the one or more financial cards within the image and a number of financial cards within the image.

7. The method of claim 6, wherein initiating the multi-party transaction comprises initiating one or more sub-transactions between two parties to the multi-party transaction, wherein the initiated one or more sub-transactions has the sub-transaction amount.

8. The method of claim 1, wherein a transaction document further comprises at least one of a receipt, a statement, a bill of sale, a menu, and an itemized list.

9. An improved system for facilitating a multi-party transaction comprising:
at least one server communicatively coupled to a remote device by a network, wherein the at least one server further comprises a non-transitory memory storing computer-readable instructions and at least one processor;
execution of the computer-readable instructions causing the at least one server to:
receive, from the remote device, an image including one or more financial cards and at least one transaction document, wherein each financial card is associated with a party to the multi-party transaction;
determine account information for each party to the multi-party transaction based on the received image of the one or more financial cards;
generate parameters for the multi-party transaction based on the retrieved account information, the relative positioning of the one or more financial cards within the received image, and the transaction document;
transmit the generated parameters to the remote device;
receive an approval for a proposed multi-party transaction based on the generated parameters; and
initiate a multi-party transaction based on the approved proposed multi-party transaction by one of crediting or debiting accounts associated with the parties to the multi-party transaction based on the determined account information, responsive to receiving an approval for the proposed multi-party transaction.

10. The system of claim 9 wherein the remote device is further configured to:
provide a user interface for peer to peer transactions, wherein the user interface is communicatively coupled to the at least one server;
display, via the user interface, at least one template for the placement of one or more financial cards and the at least one transaction document;
obtain, by a camera associated with the remote device, an image of the one or more financial cards and at least one transaction document placed in accordance with the displayed at least one template;
transmit the obtained image to the at least one server;
receive, from the at least one server, parameters for the multi-party transaction;
display, via the user interface, a proposed multi-party transaction based on the received parameters;
receive, via an input of the user interface, approval of the displayed proposed multi-party transaction from one or more users of the remote device; and
transmit, by the user interface, at least one of an approval or update of the displayed proposed multi-party transaction to the at least one server.

11. The system of claim 10, wherein the at least one server is further configured to:
receive an update of the displayed proposed transaction; and
update the proposed multi-party transaction.

12. The system of claim 9, wherein the parameters further comprise at least one of a payer, a recipient, and a transaction value, wherein the at least one payer, recipient, and transaction value are determined by relative positioning of the one or more financial cards within the received image.

13. The system of claim 9, wherein determining account information for each party to the multi-party transaction further comprises:
identifying at least one information field from each financial card in the image; and
querying a database communicatively coupled to the at least one server to determine if the financial card is associated with an account.

14. The system of claim 13, wherein the information field further comprises at least one of a name, financial card account number, financial card expiration date, security code and signature.

15. The system of claim 9, wherein account information further comprises at least one of account holder name, account type, account holder address, account holder income, account holder balance, account holder credit, account holder preferred transaction medium, and account holder contact information.

16. The system of claim 9, wherein the proposed multi-party transaction further comprises one or more sub-transaction amounts based on the relative positioning of the one or more financial cards within the image and a number of financial cards within the image.

17. The system of claim 9, wherein the at least one server of the remote device is further configured to determine a transaction amount for the proposed multi-party transaction based on the obtained image of the transaction document.

18. The system of claim 9, wherein the transaction document further comprises at least one of a receipt, a statement, a bill of sale, a menu, and an itemized list.

19. A non-transitory computer-readable storage medium encoded with instructions which, when executed by a processor, perform operations for completing a multi-party transaction, the operations comprising:
receiving, an image of one or more financial cards and at least one transaction document, wherein each financial card is associated with a party to the multi-party transaction;
determining account information for each party to the multi-party transaction based on the received image of one or more financial cards and the transaction document;
generating parameters based on the determined account information and the relative positioning of the one or more financial cards within the received image and the transaction document;
transmitting the parameters to the mobile device;
receiving an approval for the parameters; and
initiating the proposed multi-party transaction, by at least one of crediting or debiting accounts associated with the parties to the proposed multi-party transaction based on the determined account information, responsive to receiving approval for the parameters.

20. The non-transitory computer-readable storage medium of claim 19, wherein the transaction document further comprises at least one of a receipt, a statement, a bill of sale, a menu, and an itemized list.

\* \* \* \* \*